United States Patent [19]

Miller et al.

[11] 4,366,880

[45] Jan. 4, 1983

[54] DEBRIS DEFLECTOR FOR BELT DRIVE MOTORCYCLES

[75] Inventors: Russell F. Miller, Grafton; William H. Brown, Memomonee Falls; James M. Perkins, Milwaukee, all of Wis.

[73] Assignee: Harley-Davidson Motor Co., Inc., Milwaukee, Wis.

[21] Appl. No.: 225,169

[22] Filed: Jan. 15, 1981

[51] Int. Cl.³ .............................................. B60J 13/00
[52] U.S. Cl. ................................ 180/219; 280/152.2; 474/144
[58] Field of Search ................ 180/219, 231; 474/144, 474/146; 280/152.1, 152.2, 152.3

[56] References Cited

U.S. PATENT DOCUMENTS 3,724,582  4/1973  Wood .................................. 180/219

FOREIGN PATENT DOCUMENTS 145302  3/1903  Fed. Rep. of Germany ...... 474/144
1170809  5/1964  Fed. Rep. of Germany ............ 146/

Primary Examiner—John A. Pekar

[57] ABSTRACT

A debris deflector for a motorcycle which employs a belt drive for the rear wheel includes a deflector plate positioned between the motorcycle swing arm and the tire. The deflector is located between the runs of the belt. The deflector includes an indentation in the area of the swing arm, an upper portion which extends below the upper run of the belt and extends beyond the outer edge thereof and a lower portion below the swing arm which terminates inwardly of the inner edge of the lower run. The debris deflector of the present invention may also include a tab extending across and spaced apart from the front edge of the tire and may further include a flexible flap attached to the fender of the motorcycle which extends downwardly from the front edge of the fender and passes between the tab and the wheel.

3 Claims, 2 Drawing Figures

U.S. Patent    Jan. 4, 1983    4,366,880

DEBRIS DEFLECTOR FOR BELT DRIVE MOTORCYCLES

This invention relates to an improvement in motorcycles, and more particularly, to a debris deflector for belt driven motorcycles.

Heretofore the rear wheels of motorcycles have been chain driven. A belt drive instead of a chain drive has certain advantages. However, for a belt drive to be practical it must have long life. Drive belts typically are constructed from a composite of materials and do not offer as long life as chains if subjected to road debris such as twigs, stones, etc.

When the motorcycle is moving forward debris is picked up by the wheel and thrown on to the belt, and some of this debris is carried along on the belt to between the belt and sprocket to abrade, cut and wear the belt. In our invention I provide means to prevent this. Briefly, the means comprises particularly shaped and positioned deflector means to prevent the road debris from reaching the drive belt.

Figure 1:
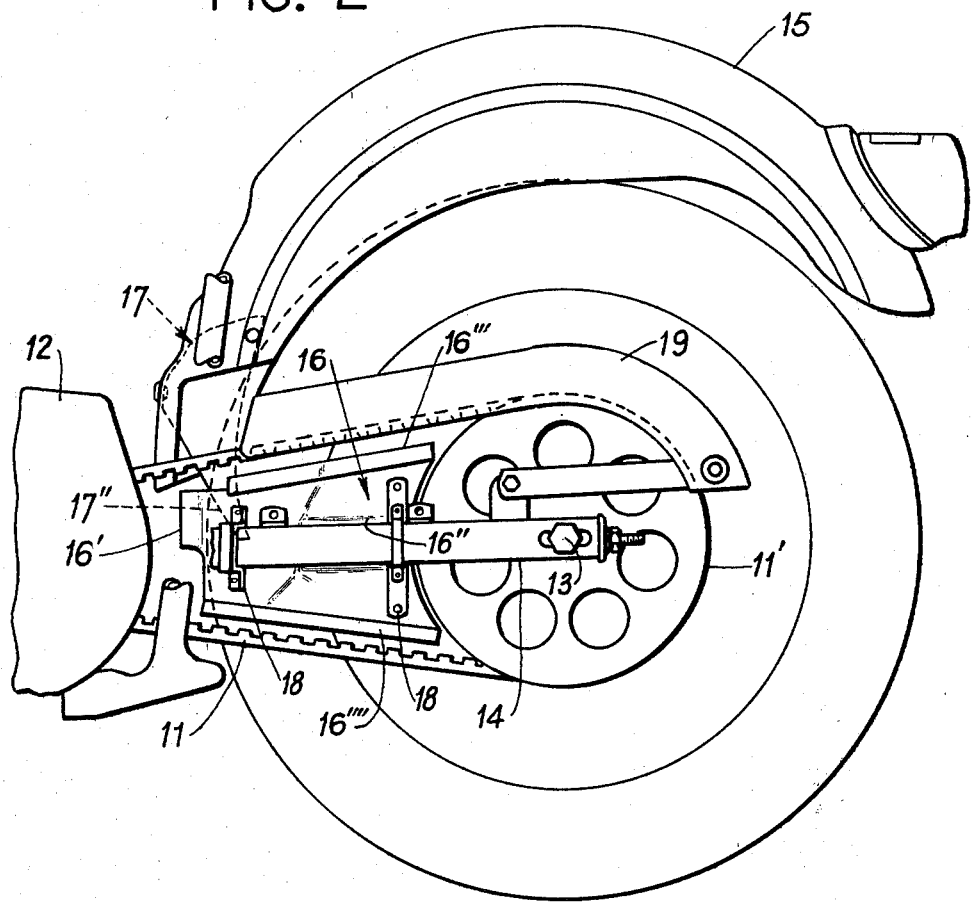

The invention will be best understood by considering the following detailed description taken in connection with the accompanying drawings in which:

FIG. 1 comprises a broken away side view of the invention and

Figure 2:
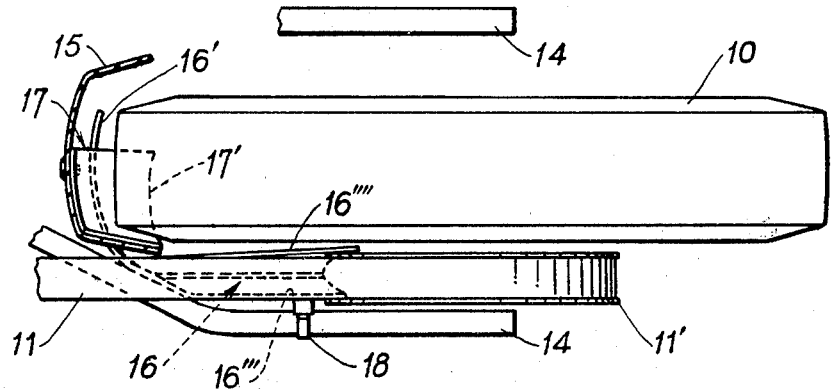

FIG. 2 comprises a broken away top view of the invention.

Referring now particularly to the drawings, shown therein is the rear portion of a rear wheel, belt driven motorcycle. The rear wheel or tire 10 thereof is driven by a toothed drive belt 11 off a drive transmission 12. The wheel 10 and drive 12 have suitable toothed sprockets or gear wheels at opposite ends of the closed loop of the belt 11, the rear one being designated by the reference numeral 11'.

As is conventional in the motorcycle art, the rear wheel 10, which turns about an axis 13, is mounted at the rear end of a swing arm 14. At its left hand end the swing arm 14 is pivoted to the not shown motorcycle frame so that the wheel 10 can move a short distance with respect to the motorcycle frame when going over sharp road bumps or the like. That is to say, the wheel axis 13 is free to move along an arc defined by the swing arm 14 as a radius.

All the foregoing, as well as a fender 15 for the rear wheel, and a mud guard 19, for what heretofore would have been a chain instead of the belt 11, is conventional and well understood by those skilled in the art.

When the motorcycle is moving forward the rear wheel is turning counter-clockwise. Road debris, and especially at the higher speeds, is picked up by the wheel tire and spins therewith and along the fender 15. The debris ultimately exits from along the wheel and fender in a downward path. At this point the debris will be sprayed, dropped, or the like on the belt 11. Debris falling on the belt, which is also rotating counterclockwise will be carried therealong to between the belt 11 and sprocket or gear wheel 11'. In other words, it becomes lodged in there, is ground between the teeth on parts 11 and 11', and will rapidly wear out the belt 11 unless debris is prevented from reaching the parts 11 and 11'.

In our invention debris deflector means which is particularly designed to overcome this problem, and in fact has done so based on road usage, is provided. The debris deflector means comprises two main parts 16 and 17, mounted respectively on the swing arm 14 and the fender 15. The part 16 is constructed from molded plastic and is mounted on the swing arm 14 by two brackets or the like 18. When viewed from the right hand end the deflector 16 has a generally isosceles trapezoidal shape. It is located between the arm 14 and wheel 10 and spans the space between the top and bottom runs of the belt loop 11 and extends from adjacent the rear sprocket or gear wheel 11' to the front or leading edge of the wheel 10 in the vicinity of the lower left end of the fender 15. At this point the deflector 16 is provided with an inturned tab 16' (see FIG. 2) which is positioned across the outer peripheral surface of the wheel tire 10, just below the point at which the tire exits from the fender 15.

What the deflector 16 and its tab 16' do is keep debris from being thrown by the tire 10 on to the belt 11. The tab 16' will do that for that part of the debris being carried along the outer periphery of the tire, and the main part 16 for that part of the debris that might be turning with the tire but along its sidewall. The part 16 has a central indentation 16'', the swing arm 14 being positioned in the indentation. At its upper and lower edges the part has narrow rubber blades of flaps 16''' and 16'''' respectively. The blade 16''' is positioned beneath the outer edge of the upper run of the belt 11 (see FIG. 2) but the bottom half of the part 16 is curved inward to position its blade 16'''' above the inner edge of the lower run of the belt 11, that is much closer to the tire. Thus, any debris falling on the top run of the belt 11 will be caught by the upper half of the part 16, as defined by its blade 16''' and confined to adjacent the tire where it will fall from therebetween to the ground, and away from the lower run of the belt 11, as determined by the position of the lower half of the part 16 and its blade 16'''' relative the lower run of the belt 11. In other words, the curvature, shape, and positioning of the debris deflector means 16, 16' is such that it very effectively keeps debris on the tire from reaching the belt by either throwing tire debris away from the belt or confining it to the tire until such time as it passes below the belt.

Before it was stated that the tire 10 is mounted on a swing arm 14 to permit relative movement between the tire and motorcycle frame. So, when the tire goes over a bump, though it may remain in contact with the ground, the frame and fender 15 connected thereto will bounce up and down relative thereto. When the fender 15 moves up relative the tire the gap or spacing between the tab 16' and the lower left or front end of fender 15 is widened. In order to help close up this gap a rubber or other flexible debris deflector flap 17 is provided. It is mounted to the inside of fender 15 and extends therefrom down along the periphery and sidewall of the tire to between the tire 10 and the other parts 16, 16' of the total debris deflector means. The parts of the debris deflector flap 17 which so extend are indicated in the drawings by reference numerals 17' and 17''. These parts 17, 17',17'' of the total debris deflector means operate similar to the parts 16, 16' to keep tire debris off and away from the drive belt 11.

It will now be seen that the invention provides a simple and low cost yet effective way of protecting a rear wheel motorcycle drive belt from the deleterious effects of road-tire debris. Also, the particular mode of executing the invention requires no change in the basic design and structure of existing belt driven motorcycles. In fact, the parts 16, 17, 18 can be provided as a kit to existing owners of belt driven motorcycles which they can then readily install themselves.

I claim:

1. In a rear wheel belt driven motorcycle, said motorcycle having a rear wheel mounted on a swing arm and having a belt drive with top and bottom runs extending to said wheel respectively above and below said swing arm, a debris deflector positioned between said arm and said wheel and spanning the space between said runs, said deflector including an upper edge lying beneath and extending beyond the outer edge of said upper run and a lower edge lying above and terminating at a location inwardly of the inner edge of said lower run, said deflector extending across the side wall and peripheral surfaces of said wheel to deflect road debris carried by said wheel off and away from said belt.

2. In a motorcycle as set forth in claim 1 including a fender for said wheel, said fender extending for a distance of approximately the upper one-half of said wheel, a portion of said debris deflector comprising an inturned tab portion extending across and forwardly of the outer peripheral surface of said wheel.

3. In a motorcycle as in claim 2, additional debris deflector means to close the space below the front end of said fender and said mentioned deflector extending portions, said additional debris deflector means comprising a flexible debris deflector flap affixed to the inside of said fender front end and extending down therefrom along the sidewall and peripheral surfaces of said wheel to inside said first mentioned debris deflector extending portions.

* * * * *